Figure 3:
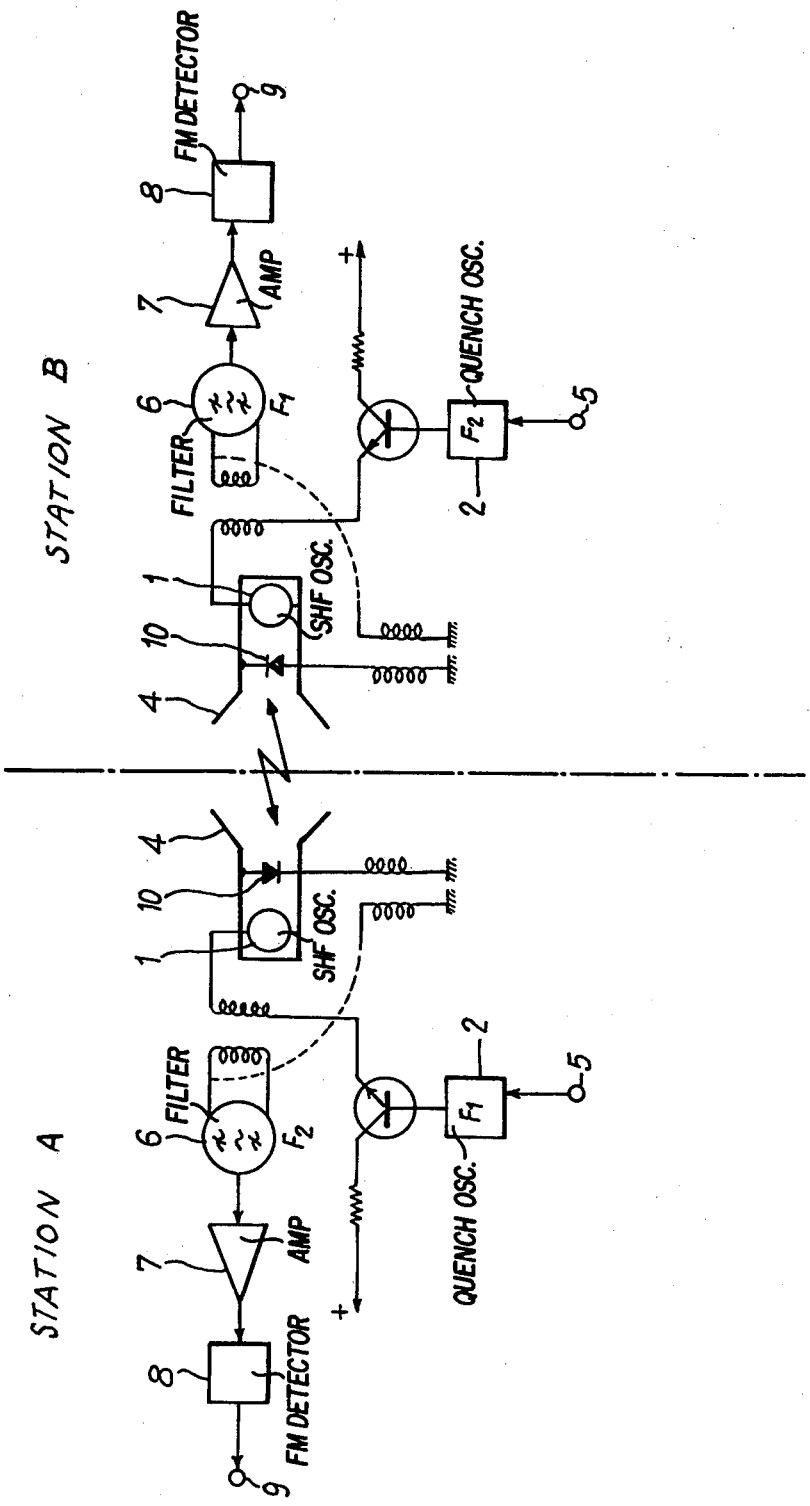

United States Patent [19]

Pottier

[11] 4,398,283
[45] Aug. 9, 1983

[54] SUPERHIGH-FREQUENCY DUPLEX MODE TELECOMMUNICATIONS DEVICE

[76] Inventor: Bernard Pottier, Saint Georges-de-Luzencon, 12100 Millau, France

[21] Appl. No.: 197,100

[22] PCT Filed: Dec. 28, 1979

[86] PCT No.: PCT/FR79/00132
§ 371 Date: Aug. 21, 1980
§ 102(e) Date: Aug. 29, 1980

[87] PCT Pub. No.: WO80/01446
PCT Pub. Date: Jul. 10, 1980

[30] Foreign Application Priority Data

Dec. 29, 1978 [FR] France ................................ 78 36854

[51] Int. Cl.³ ............................................. H04B 1/56
[52] U.S. Cl. ......................................... 370/30; 370/38
[58] Field of Search .................... 370/30, 24, 38, 32, 370/39; 455/215, 336

[56] References Cited

U.S. PATENT DOCUMENTS

| | | | |
|---|---|---|---|
| 2,273,097 | 2/1942 | Foster et al. | 455/215 |
| 2,333,719 | 11/1943 | Herold | 370/30 |
| 2,577,781 | 12/1951 | Loughlin | 455/215 |
| 3,112,445 | 11/1963 | Holden et al. | 455/336 |
| 3,794,757 | 2/1974 | Knabe | 370/30 |

*Primary Examiner*—Douglas W. Olms
*Attorney, Agent, or Firm*—Darby & Darby

[57] ABSTRACT

The invention concerns a duplex superhigh-frequency telecommunications device.

The quench oscillator at each station delivers a specific frequency signal frequency-modulated by the information to be transmitted, the carrier quench signal being used as a subcarrier of the information.

Application to microwave telephone telecommunications.

5 Claims, 6 Drawing Figures

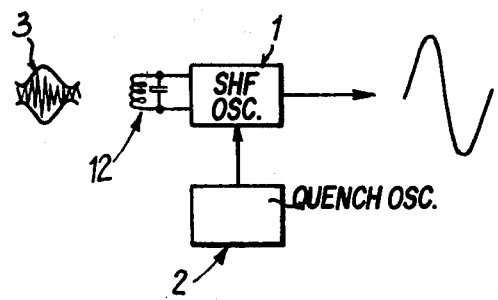
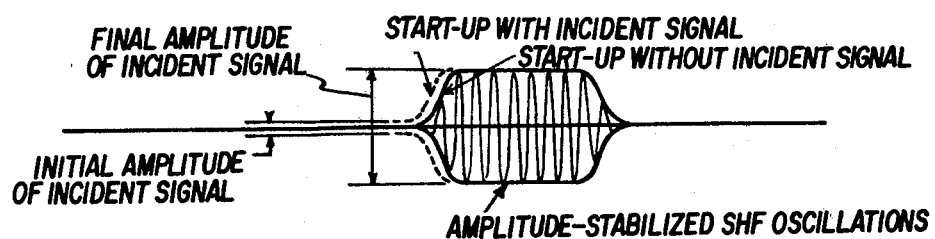
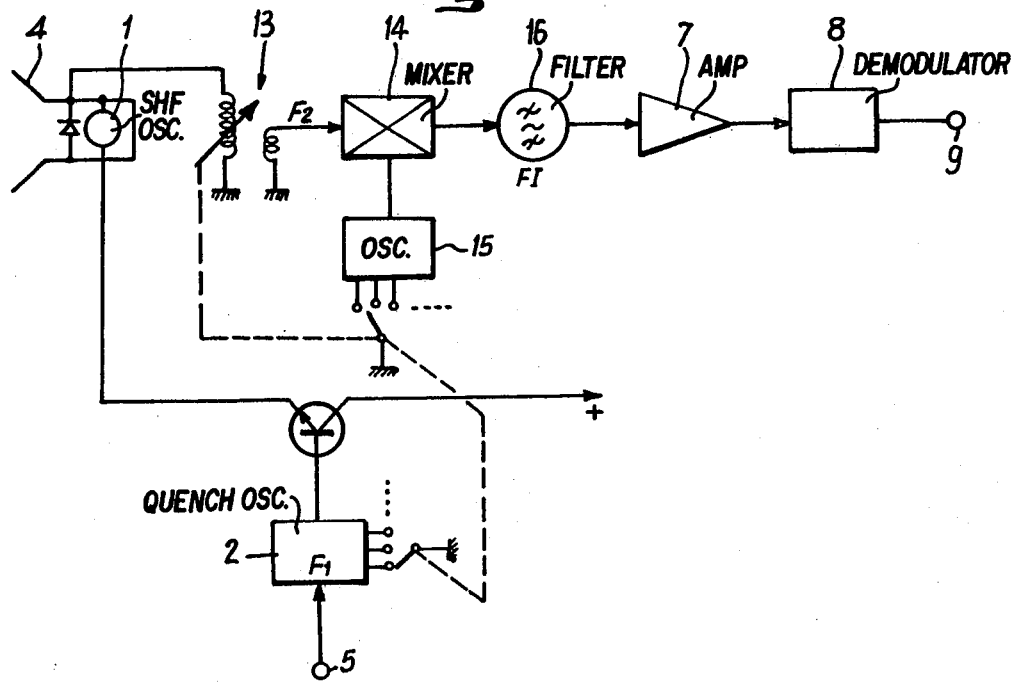

SUPERHIGH-FREQUENCY DUPLEX MODE TELECOMMUNICATIONS DEVICE

The invention concerns a superhigh-frequency telecommunications device operating in the duplex mode.

The problem of microwave telecommunications is currently coming up against frequency congestion. The recourse to superhigh frequencies SHF (above 10 GHz) makes it possible to place a large number of telecommunications systems in a limited geographic space due to the use of highly directional antennas. It also permits, at equal passbands, a larger number of systems to be placed in one frequency band, or the use of systems with a large passband.

As propagation is virtually optical, one can use highly directional antennas having small dimensions at these frequencies. The large gain of directional antennas only permits the use of very low SHF power. One thus considerably limits the congestion of the ether. Finally, these very high frequencies permit the use of broad modulation spectra (telephony, multiplex, data transmission, video transmission, etc.).

Such a duplex superhigh-frequency telecommunications device would permit the connection, to an existing telephone network, of subscribers for which it is impossible or too costly to install a telephone line. This device would also permit the interconnection of two fixed points, in line-of-sight, to allow the transmission of all types of information which could not be carried by a standard telephone line.

However, such a duplex superhigh-frequency telecommunications device, as it can exist at present, has the disadvantage of being very expensive, especially with superhigh frequency, because it should comprise, for full duplex realization, at each end: a transmitter, a receiver, two antennas or one antenna with a decoupling system. On the other hand, it uses two carrier frequencies to realize the duplex, with the protection necessary for filtering one frequency in relation to the other.

The invention is designed to avoid the disadvantages of known devices by using equipment that is very simple and not very cumbersome. It concerns a superhigh-frequency telecommunications device operating in the duplex mode of the type comprising, for each station, a superhigh-frequency oscillator which delivers a carrier to an antenna and a quench oscillator which delivers a carrier quench signal, characterized in that the quench oscillator at each station delivers a specific frequency signal, and is frequency-modulated by the information to be transmitted so that the carrier quench signal is used as a subcarrier of the information to be transmitted; and in that each station comprises a selective filter tuned to the frequency of the quench signal of the other station and a frequency modulation detector capable of restoring the information transmitted.

According to another characteristic of the invention, each station operates in superregeneration and assures both transmission and reception with the same antenna.

Other characteristics of the invention result from the description which follows, made with reference to the attached diagram in which one can see:

FIG. 1: a simplified schematic diagram of a known superregenerative device.

FIG. 2: a representation of the shape of the signals delivered by the device in FIG. 1.

FIG. 3: a simplified schematic diagram of a model design of a telecommunications device according to the invention.

FIG. 4: a simplified schematic diagram of a model design of a telecommunications device according to the invention using a heterodyne oscillator for reception.

Figure 5:
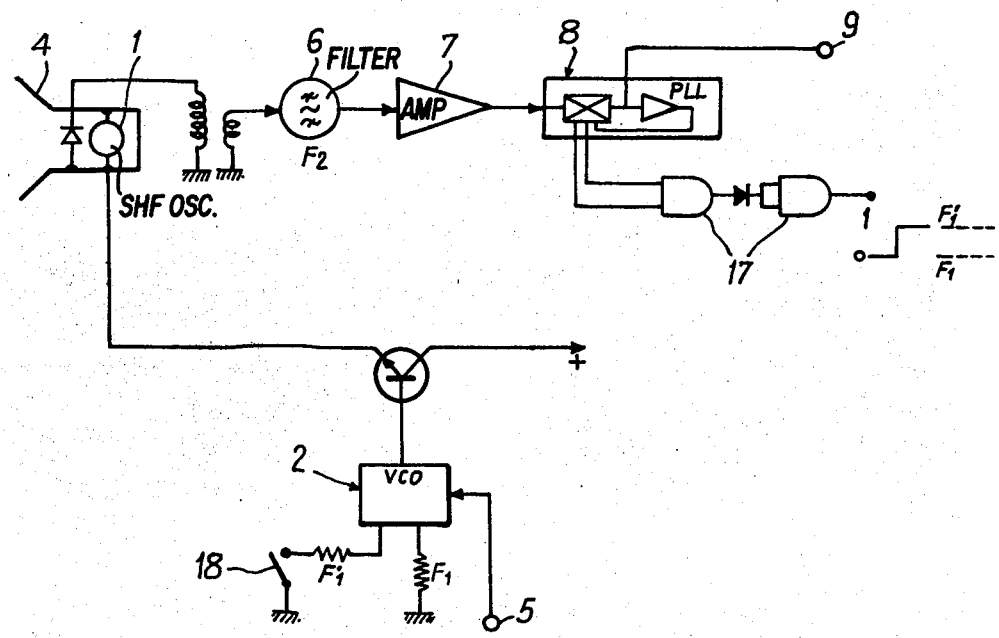

FIG. 5: a simplified schematic diagram of a model design of a station for a telecommunications device according to the invention capable of assuring the restoration of conventional telephone signals.

Figure 6:
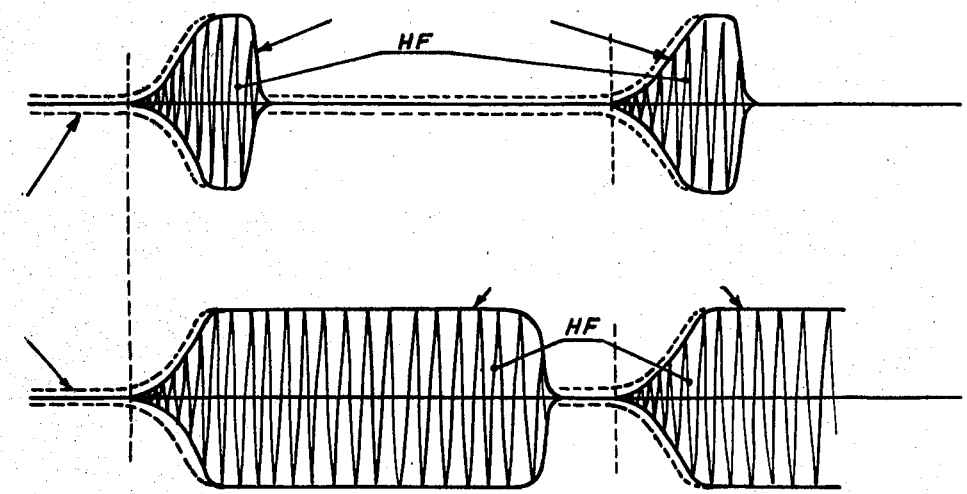

FIG. 6: a representation of the shape of the signals and an example of the ratio of SHF pulse length.

The invention described here permits considerable simplification of the duplex superhigh-frequency telecommunications device. It also permits the use of only one SHF carrier frequency to realize the duplex link in both directions, and this without altering the possibilities of transmitting various information modes. It is especially adapted to solid-state superhigh-frequency oscillators (Gunn diodes, impatt diodes, avalanche diodes, and particularly bipolar transistors or FETs). The result of these considerations is a substantial reduction in equipment cost, a simplification of the circuits and, consequently, increased reliability. Another result, especially with transistors having an efficiency higher than that of diodes, is a substantial decrease in current consumption which permits the supply of power from cells or small rechargeable batteries, in particular from solar cells having a small surface area. The invention utilizes the well-known process of superregeneration, the principle of which is recalled in brief:

A superregenerative device comprises a high-frequency oscillator 1 the oscillations of which are alternately blocked by a signal of lower frequency called the quench signal produced by an oscillator 2. This quench signal blocks and unblocks the SHF oscillator by altering its polarization. Starting from the blocked state when the polarization increases, a moment is reached when the SHF oscillations are produced in the oscillatory circuit 12 of the oscillator 1. If a disturbing SHF signal 3, having a frequency close or equal to that of the SHF oscillator, is introduced into the oscillatory circuit 12, it will alter the polarization of the SHF oscillator 1 and produce a startup of SHF oscillations in advance of the startup produced by the quench signal. This advance will be greater as the disturbing signal reaches a higher level. If this disturbing signal is amplitude-modulated, the advance startup will therefore vary with the rhythm of the amplitude modulation of the disturbing signal. It will be sufficient to detect the SHF oscillations produced, hence their advance startup, in order to restore the envelope curve of the modulation of the disturbing signal. This disturbing SHF signal may be a SHF signal that one wishes to receive. It therefore suffices to connect an antenna to the oscillatory circuit of the oscillator 1 in order to obtain a receiver with very high sensitivity since the thermionic background noise alone is sufficient to modulate the advance startup of the oscillations and to produce the "waterfall" noise characteristic of superregeneration, a noise which disappears as soon as a coherent signal with a sufficient level is received. One will also note that the detection sensitivity of this device is not linear but logarithmic, which assures goo regulation of the signal received. FIG. 2 gives the shape of the SHF signal in superregeneration.

The quench signal may be either generated by the SHF oscillator itself when made to self-oscillate at low frequency, but in this case the quench frequency varies with the intensity of the signal received, or generated by an external low-frequency oscillator. The latter solution permits one to have a very stable quench frequency; it also permits quenching of an oscillator that oscillates at a high level.

One therefore sees that a superregenerative device behaves like a very sensitive detector, hence like a receiver and like a transmitter since it oscillates. It would suffice to modulate it at low frequency so that an effective signal can be transmitted at the same time as another effective signal can be received. This procedure has already been used in several devices, but presents serious difficulties in the separation of the two duplex channels, difficulties still too great to overcome in superhigh-frequency oscillators.

An essential characteristic of the invention consists in the use of the quench frequency, and in regarding it as a subcarrier which itself carries the information to be transmitted.

Each of the stations A and B, permitting a duplex link, according to the invention, therefore comprises (FIG. 3):

An antenna 4 connected to a superhigh-frequency oscillator 1 the oscillations of which are quenched by a quench oscillator 2. This quench oscillator oscillates at a frequency $F_1$ in station A and at a frequency $F_2$ in station B. This quench oscillator 2 is frequency-modulated by the signal to be transmitted 5. Next, the superhigh-frequency oscillator 1 is followed by a selective filter 6 tuned to the frequency $F_2$ in station A and to the frequency $F_1$ in station B. This filter is followed by a limiting amplifier 7 and a frequency modulation detector 8 which restores the signal transmitted 9.

One therefore notes that each superregenerative device detects the quench frequency of what it receives. Only the selectivity of the filters 6 determines the separation of the two quench frequencies.

It has been indicated that such a device operates at superhigh frequency (which is not exclusive). The value of the quench frequency is therefore not critical. It will be selected as a function of the signal to be transmitted from several hundred kHz for transmission of a voice telephone signal to several tens MHz for transmission of a video signal, for example. It may be generated by a master oscillator or by a crystal-controlled device or another stable method.

In the superregenerative device, the detection of the advance startup of oscillations may be effected by the SHF oscillator itself, since nonlinear operating conditions are produced. However, in some cases and particularly at superhigh frequency, it is possible to connect a separate detector 10 to the oscillatory circuit in order to increase the reception sensitivity of the device. FIG. 3 represents such a circuit, the dotted line designating a preferred electrical connection in this case.

It is also possible to no longer use a SHF oscillator to produce superregeneration, but a SHF amplifier which amplifies the signal from an oscillator or from a multiplier controlled by a highly stable element. In this case, the disturbing signal will alter the deblocking level of the SHF amplifier and, consequently, the width of the SHF pulses or pulse packets amplified. The phenomenon is identical to that of superregeneration, and the detection of amplified and quenched SHF permits restoration of the modulation curve of the disturbing signal. It is thus necessary to use a detector connected to the oscillatory circuit of the SHF amplifier in order to restore these detected signals, and the sensitivity of such a system is lower than that of a superregenerative circuit such as described above.

The generation of the quench signal by the oscillator 2 may be effected by any known means. However, an oscillator of the VCO (voltage-controlled oscillator) type used in 2, if higher stability is not desired, makes it very simple to obtain adjustment of the quench frequency and its frequency modulation.

Demodulation of the quench frequency 8 may be effected by any known means, but here again the use of a PLL (phase-lock loop) system in 8 permits one to obtain a demodulation system that is simple, reliable, and gives a very good signal/noise ratio associated with the phase comparison method of the PLL circuit.

It is possible to complete the above invention with a certain number of improvements:

1°: It is possible to modulate the quench signal produced in 2 by a certain number of frequencies, themselves frequency- or amplitude-modulated by the different signals to be transmitted, and to thus realize a multichannel system.

2°: It is possible to modulate directly the SHF oscillator 1 to which superregeneration is applied by several frequencies, different from the quench frequency, and to modulate these frequencies by the signals to be transmitted and to thus realize a multichannel system.

3°: It is possible, in order to simplify the amplification and demodulation of the subcarrier of the opposite station, and this particularly in a network comprising several stations, to realize this amplification and this demodulation according to the well-known process of mixing (or superheterodyne). The use of this process permits the immediate tuning of one station to one or another of the stations opposite. One can thus use a certain number of subcarrier channels, with a single superhigh-frequency carrier, to realize a telecommunications network. FIG. 4 gives an example of a station so designed. It comprises:

An antenna 4, a superhigh-frequency oscillator 1 quenched by the signal from the quench oscillator 2 which can be tuned to several frequencies corresponding to various stations in the network and which is modulated by the effective signal 5. The SHF oscillator 1 is followed by a preselector 13 which can be tuned to the quench frequency specific to various stations in the network. This preselector 13 is followed by a mixer 14 which receives a heterodyne signal from an oscillator 15 the frequency of which is adjusted every time so that the beat of this frequency with the quench frequency from the selected station in the network is constant for all the stations in the network, and equal to a value FI. The frequency of this oscillator 15 can be switched by a single command with the preselector 13 and the quench oscillator 2 so as to realize simple channel switching. The mixer 14 is followed by a band filter 16 tuned to the frequency FI which assures the selectivity of the system and the separation of channels. This filter 16 is followed by a limiting amplifier 7 and by a demodulator 8 which restores the effective signal 9.

All variations of this procedure may be utilized.

4°: It is possible to design a system permitting the restoration of call, ringing and/or automatic dialing signals identical to those produced by line disconnections over the lines of telegraphic telephone networks.

Such a system may be simply realized by using VCO and PLL circuits, already mentioned, for the generation 2 and demodulation 8 of quench signals. An example is given (FIG. 5) in the case of a duplex link, describing only one of the stations, the other being symmetric.

The quench signal $F_1$ of station A is maintained, during watching, at a value $F_1'$, close to $F_1$, but so that it is outside the capture range of the PLL demodulator 8 in station B tuned to $F_1$. Similarly, the quench signal $F_2$ of station B is maintained, during watching, at a frequency $F_2'$, close to $F_2$, so that it is outside the capture range of the PLL demodulator 8 in station A tuned to $F_2$.

Each PLL demodulator is connected to a circuit 17 which detects the phase lock state of the PLL circuit. This circuit is at the logic state 1 in the absence of locking, and at the logic state 0 on locking. If station A is carrying traffic (for example, telephone receiver removed), the contact 18 makes the quench signal of station A go from the value $F_1'$ to the value $F_1$. At this moment, the PLL 8 in station B is locked. The circuit 17 in station B passes into the state 0 and can activate, in station B, a bell, an alarm system, or any other system. If the receiver is removed in station B, its ringing can be stopped and the contact 18 makes the quench signal of station B go from the value $F_2'$ to the value $F_2$, and the communication can be established. If station B is not connected to a hand set, but to a telephone line, it may be the state 0 of the circuit 18 in station B that makes the quench frequency of station B go from the value $F_2'$ to the $F_2$. In the opposite direction, if station B receives a call over a line to be transmitted to station A, it may be the call signal over the line that makes the quench signal of station B go from the value $F_2'$ to the value $F_2$, indicating to the correspondent in station A that his correspondent, located at the end of the line connected to station B, is calling him.

It is possible to have the contactor of the hand set in station A connected in series to a telephone dial which will make the quench frequency go from the value $F_1'$ to the value $F_1$ to the rhythm of the dial pulses. In station B, the circuit 18 will successively pass from the state 1 to the state 0 as a function of these pulses, and an auxiliary amplifier circuit following 18 will permit restoration of the line currents over the telephone line, and thus activate the switching device in the automatic telephone exchange. The process is reversible from station B to station A.

Any method other than the use of VCO and PLL circuits may be provided to effect this switching (use of the selectivity of the filter 6, for example).

5°: In addition to the circuit described above, it is possible to use a monitoring system which economizes on the current consumed by the SHF oscillator, reduces the SHF power supplied to the antenna and, consequently, reduces the possibilities of interference.

Indeed, the sensitivity of superregeneration is associated with the slope of the quench signal and, to a certain extent, with its frequency but is not, or very little, dependent on the width of the SHF pulse. It is therefore sufficient, in the circuit in FIG. 5, to modify the ratio of the quench frequency cycle according to whether the value of this quench frequency is $F_1'$ and $F_2'$ or $F_1$ and $F_2$. At $F_1'$ and $F_2'$, the length of the SHF pulses will be very short and just necessary for achieving superregeneration sensitivity. At $F_1$ and $F_2$, the length of the SHF pulses will be as long as possible to obtain the most SHF power possible. FIG. 6 gives an example of the ratio of SHF pulse length.

6°: With this process it is possible to receive simultaneously, via a station A, two or more stations B, C, etc. transmitting over the same superhigh frequency provided that the quench frequencies FdB, FdC, etc. of stations B, C, etc. are different from each other and that station A has as many series-connected preselectors and systems for the filtering and demodulation of the quench frequencies FdB, FdC, etc. as there are in stations B, C, etc.

Indeed, since transmission from each station B, C, etc. is quenched by the quench frequency and reception is effected as a result of this quenching, one may consider that there is some sort of sampling of the signals received. Consequently, if there is no absolute synchronization between the quench frequencies FdA, FdB, FdC, etc., one may consider that there is successive random reception at station A from stations B, C, etc. In time, this sampling of receptions is integrated and yields, at the output of each channel in station A, a continuous reception of the effective signal from stations B, C, etc. Nevertheless, it would be advisable to choose the values of the different quench frequencies such that there is the least possible risk of interference.

7°: In order to produce the quench signal at a stable frequency, it is possible to use the superhigh-frequency oscillator itself while replacing the master oscillator, generally comprising a resistance-condenser assembly, with an inductance-condenser device the frequency of which is only more dependent on the value of these two components. In this case, the frequency modulation of the quench signal may be effected by applying the modulation signal to a variable-capacitance diode connected in parallel to the condenser of the inductance-condenser assembly.

Apart from stability, this device has the advantage of producing a sinusoidal quenching and reducing the frequency spectrum radiated by the superhigh-frequency oscillator in the superregenerative state, and simplifying the realization of the device by the suppression of circuits individually producing quench oscillation.

In a general manner, one may also replace, for each station, the circuit assembly comprising the selective filter and the demodulator, and, if necessary, the mixer and heterodyne oscillator, with a selective demodulation device such as, for example, a phase-lock loop synchronous demodulator.

The invention described above and its improvements have been prescribed for use specifically in the superhigh-frequency band. However, this frequency band is not limitative, and the invention may be applied wherever the well-known process of superregeneration is used, with quenching being either generated by a separate oscillator or self-generated by the SHF oscillator itself.

The different improvements indicated above may be used conjointly or individually.

I claim:

1. In a superhigh frequency duplex mode telecommunications device for communication between a first station and others in a network of stations, each of said stations in said network having a superhigh frequency oscillator providing a carrier frequency to an antenna, and a quench oscillator providing a quench signal, said quench oscillator at each of said stations providing a specific frequency signal acting as a subcarrier signal, said carrier signal being frequency modulated by the information it is desired to transmit, and in which each of said stations further includes a selective filter tuned to the frequency of said quench signal utilized in the station from which it is desired to receive a signal and a frequency modulation detector for detecting said signal, said stations operating in superregeneration, using the same antenna for transmission and reception, said device comprises:

preselector means coupled to said oscillator for tuning said quench oscillator to the frequency assigned to a specific station in said network with which said first station desires to communicate;

means coupled to said preselector means for mixing;

adjustable frequency heterodyne oscillator coupled to said mixer, said heterodyne oscillator being adjusted to provide a constant heat frequency resulting from the mixing of said heterodyne oscillator's output frequency and said quench frequency of said other station in said network whose signal it is desired to receive;

wherein said first station quench oscillator is tunable to frequencies corresponding to said other stations in said network; and mechanical switch means coupled to said quench oscillator, said preselector and said heterodyne oscillator, for the simultaneous frequency adjustment thereof.

2. Device according to claim 1 characterized in that, for the restoration of conventional telephone signals, it comprises a voltage-controlled quench oscillator tuned, during the watching state, to a frequency close to the quench frequency, and a phase-lock loop demodulator connected to a circuit which detects its phase lock state so that, when one station passes into the traffic state, its quench oscillator adjusts to its quench frequency and that the demodulator of the other station is thus locked in phase, the circuit which detects its phase lock state thus delivering a conventional signal.

3. Device according to one of claims 1 or 2, characterized in that, for simultaneous communications between one station and several others, the said station comprises a number of series-connected preselectors, each connected to a circuit comprising a mixer, a heterodyne oscillator, a selective filter, and a demodulator.

4. The device according to claim 1 or 2 wherein each station includes a selective demodulation circuit.

5. The device according to claim 3 wherein each station includes a selective demodulation circuit.

* * * * *